US009243554B2

(12) United States Patent
Balendra et al.

(10) Patent No.: US 9,243,554 B2
(45) Date of Patent: Jan. 26, 2016

(54) ROTARY ENGINE COMPRISING A CERAMIC MATERIAL

(71) Applicant: Ceramic Rotary Engines, Inc., Dallas, TX (US)

(72) Inventors: Raj Balendra, Glasgow (GB); J. Leslie Henshall, Somerset (GB); Theyvendra S. Thuraisingham, Dallas, TX (US); Raymond J. J. Walker, Hudson, NH (US)

(73) Assignee: Ceramic Rotary Engines, Inc., Dallas, TX (US)

( * ) Notice: Subject to any disclaimer, the term of this patent is extended or adjusted under 35 U.S.C. 154(b) by 0 days.

(21) Appl. No.: 13/771,866

(22) Filed: Feb. 20, 2013

(65) Prior Publication Data

US 2014/0230776 A1 Aug. 21, 2014

(51) Int. Cl.
*F02B 53/00* (2006.01)
*F02B 55/02* (2006.01)
(Continued)

(52) U.S. Cl.
CPC ............... *F02B 53/00* (2013.01); *C04B 35/486* (2013.01); *F02B 55/02* (2013.01); *F02B 55/08* (2013.01);
(Continued)

(58) Field of Classification Search
CPC .......... F02B 53/00; F02B 55/08; F02B 55/02; C04B 35/486; C04B 2235/5409; C04B 2235/9607; C04B 2235/3229; C04B 2235/3206; C04B 2235/5445; C04B 2235/3246; F05C 2203/0852; F05C 2251/042
USPC ........................... 123/200, 242; 501/103, 104
See application file for complete search history.

(56) References Cited

U.S. PATENT DOCUMENTS 2,988,008 A 6/1961 Wankel
3,287,143 A * 11/1966 Yavorsky ...................... 501/104

(Continued)

FOREIGN PATENT DOCUMENTS

GB 1523853 A 9/1978
GB 2432630 A 5/2007
JP 59153923 A 9/1984

OTHER PUBLICATIONS

UltraHard Materials, Ltd. Webpage [online]. UltraHard Materials, Jun. 13, 2007 [retrieved on Jan. 26, 2014]. Retrieved from the Internet: https://web.archive.org/web/20070613044536/http://www.ultrahardmaterials.co.uk/engine.html>.*

(Continued)

*Primary Examiner* — Jorge Pereiro
*Assistant Examiner* — Jason T Newton
(74) *Attorney, Agent, or Firm* — Gardere Wynne Sewell LLP

(57) ABSTRACT

Described is an assembly for an internal combustion rotary engine of a single or multi-rotor type. The assembly includes parts without cooling channels that comprise a monolithic ceramic material or ceramic matrix composite material capable of allowing the engine when assembled to operate at elevated temperatures that would cause metal parts of a metal engine to lose strength, lose structural and mechanical integrity, suffer excessive oxidation/corrosion and/or fail. The ceramic material also allows the engine when assembled to operate with significantly lower heat loss to the surrounding environment as compared with a similar engine made using all metal parts. The ceramic material allows the engine when assembled to operate without requiring substantial cooling elements or an external fluid (e.g. water) cooling system. The engine when assembled as described will retain more heat or operate with a substantially reduced rate of heat rejection when compared to an entirely metal rotary engine.

20 Claims, 4 Drawing Sheets

(51) Int. Cl.
*F02B 55/08* (2006.01)
*C04B 35/486* (2006.01)

(52) U.S. Cl.
CPC . *C04B 2235/3206* (2013.01); *C04B 2235/3229* (2013.01); *C04B 2235/3246* (2013.01); *C04B 2235/5409* (2013.01); *C04B 2235/5445* (2013.01); *C04B 2235/9607* (2013.01); *F05C 2203/0852* (2013.01); *F05C 2251/042* (2013.01)

(56) References Cited

U.S. PATENT DOCUMENTS

| | | | | | |
|---|---|---|---|---|---|
| 3,359,956 | A | | 12/1967 | Bentele | |
| 3,485,218 | A | | 12/1969 | Clarke | |
| 3,887,387 | A | * | 6/1975 | Sturhahn | 501/104 |
| 3,995,602 | A | | 12/1976 | Burley | |
| 4,012,180 | A | | 3/1977 | Berkowitz et al. | |
| 4,021,163 | A | | 5/1977 | Morita et al. | |
| 4,059,370 | A | | 11/1977 | Gibson | |
| 4,072,131 | A | | 2/1978 | Pentel | |
| 4,508,066 | A | | 4/1985 | Hartsock | |
| 4,541,786 | A | * | 9/1985 | McLean | 417/407 |
| 4,690,911 | A | * | 9/1987 | Nakada | 501/105 |
| 5,017,532 | A | * | 5/1991 | Sonnenberg et al. | 501/103 |
| 5,047,373 | A | * | 9/1991 | Ketcham | 501/103 |
| 5,832,731 | A | * | 11/1998 | Kuehnle | 60/595 |
| 2005/0079971 | A1 | * | 4/2005 | Nawa | 501/105 |
| 2011/0136653 | A1 | * | 6/2011 | Koebel et al. | 501/82 |
| 2012/0048230 | A1 | * | 3/2012 | Darrow | 123/236 |

OTHER PUBLICATIONS

Ceramic Rotary Engines, Inc. Webpage [online]. Ceramic Rotary Engines, Oct. 8, 2007 [retrieved on Jan. 26, 2014]. Retrieved from the Internet: https://web.archive.org/web/20071008135331/http://www.ceramicrotaryengines.com/>.*

Ceramic Rotary Engines, Inc. Webpage [online]. Ceramic Rotary Engines, Sep. 26, 2009 [retrieved on Jan. 26, 2014]. Retrieved from the Internet: https://web.archive.org/web/20090926065433/http://www.ceramicrotaryengines.com/>.*

UltraHard Materials, Ltd. Webpage [online]. UltraHard Materials, Sep. 18, 2000 [retrieved on Jan. 26, 2014]. Retrieved from the Internet: https://web.archive.org/web/20001026034637/http://www.ultrahardmaterials.com/>.*

Yamamoto, Kenichi, Rotary Engine, Publishers: Toyo Kogyo Company Ltd (First Edition Oct. 1971), 72 pgs., 1981.

Energy Losses—Where the Energy Goes, US Dept of Energy, Office of Transportation & Air Quality; Fuel Economy, from http://www.fueleconomy.gov/feg/atv.shtml; accessed Sep. 17, 2009; 1 pg.

Emissions #1—Combustion Chemistry, Toyota Motor Sales USA, Autoshop 101, Technical Articles, http://www.autoshop101.com/autoshop15.html/#OBD1; accessed Mar. 1, 2012; 9 pages.

Ronney, P.D., Hydrocarbon-fueled Internal Combustion Engines: "The worst form of vehicle propulsion . . . except for all the other forms," Conference on Alternative Futures for the Automobile, May 23-24, 2007, Los Angeles, CA, 2007.

Sanchez, Tomas de Almeida Formosinho, Experimental Study of a Kerosene Fuelled Internal Combustion Engine, Masters Thesis, Industrial Energy Systems Laboratory, Federal Institute of Technology, Lausanne, Switzerland, Sep. 2008.

Kamo, Roy, et al., Adiabatic Wankel Type Rotary Engine, Phase II Final Report, Adiabatics Inc, Columbus, IN 1988.

Javadi, M. et al., Arrhenius Law Modification for Turbulent Combustion Modelling, The Third Fuel & Combustion Conference of Iran, Tehran, Feb. 2010.

Sliney, Harold E., Composite Bearing and Seal Materials for Advanced Heat Engine Applications to 900 C, Workshop on Coatings for Advanced Heat Engines, Castine, ME, NASA Glenn Research Center Report DOE/NASA/50162-4, 1990.

Weston, Kenneth C., The Wankel Rotary Engine, EBook Chapter 7, Publishers: University of Tulsa, 1992, pp. 261-281.

Ronney, Paul D., Internal Combustion Engines: The Worst Form of Vehicle Propulsion—Except for All the Other Forms; a Primer on IC Engines and Their Alternatives; Dept. of Aerospace and Mechanical Engineering, Univ. of Southern California, Mar. 2012, 65 pgs.

Worley, Paul, The Rock Ceramic Rotary Engine, <https://docs.google.com/viewer?a=v&q=cache:XmrKVBBqITYJ:94.193.105.167/ce/Rock%2520Engine.pdf+ceramic+rotary+engine+paul+worley&hl=en&pid=bl&srcid=ADGEESiPQUv-ZHSoNGPwIB8cNMvkxTuid4uR40YJIm__4dF3hE8pliuT6tNPH0OStJhstj4FLKaHeo__38gwqv8IhaYu6Qxl33ixBOIsN-iXznX4JPWo9L8TNX9Hlw9R8LtNsh9ox8CDs&sig=AHIEtbSVok3cbQ7EzdFmWZCazpez6j7m1A>; accessed Nov. 25, 2012; 10 pgs.

McLean, A.F., Materials Approach to Engine/Component Design, In: Ceramic Materials and Components for Engines, Proceedings of the Second International Symposium, Lubeck-Travemunde FRG, Apr. 14-17, 1986, pp. 1023-1034.

Presentation of MEMS Rotary Internal Combustion Engine by Kelvin Fu, dated May 10, 2002, Department of Mechanical Engineering, University of California, Berkeley, http://euler.me.berkeley.edu/mrcl/; 38 pages.

Weston, Kenneth C., "Fundamentals of Energy Conversion," EBook Chapter 1, Publishers: University of Tulsa, 1992, pp. 1-33.

Weston, Kenneth C., "Reciprocating Internal Combustion Engines," EBook Chapter 6, Publishers: University of Tulsa, 1992, pp. 224-261.

Green, William H. et al.; Combustion Chemistry of a New Biofuel: Butanol; U.S. DOE Energy Frontier Research Center—Combustion Science—Massachusetts Institute of Technology, accessed at least as early as Mar. 1, 2012; 21 pages.

PhysicsForums.com thread "Combustion Temp's for an IC Engine," http://www.physicsforums.com/showthread.php?t=99013, accessed at least as early as Mar. 1, 2012; 5 pages.

* cited by examiner

ROTARY ENGINE COMPRISING A CERAMIC MATERIAL

BACKGROUND

The invention described relates generally to an internal combustion engine, including a rotary engine, that may operate at elevated temperatures, retains heat and does not require substantial cooling.

An ideal material for an internal combustion (IC) engine should possess four properties. One, to be able to operate at sufficiently high temperatures to burn fuel completely and efficiently. Two, to be able to retain heat inside the combustion chamber. Three, to be able to operate in the hot, humid and corrosive environment of the IC engine while maintaining its mechanical and structural integrity. Four, to not require fluid (water or oil) cooling; water cooling not only extracts or draws out valuable heat from the combustion chamber wall but also creates and maintains a cool flame-quenching zone at the chamber wall, both of which reduce engine thermal efficiency approximating at least 25% to as much as 60% of the energy contained in the fuel.

Metal internal combustion engines are typically made from cast iron, steel or aluminum which generally have melting points lower than 2900 degrees Fahrenheit (1600 degrees Celsius). Such engines require fluid cooling to prevent deformation or localized melting of the engine material. Water and oil cooling causes metal engines to operate at temperatures well below the thermodynamic efficiency of the fuel combustion process. Furthermore these metals have relatively high thermal conductivities which mean that engines made from these metals readily lose heat reducing their thermal efficiency too. Metals are therefore not ideal engine materials.

SUMMARY

Described herein is an improved internal combustion rotary engine, in which one or more parts of the internal combustion rotary engine is made of a ceramic material that forms a contiguous mass with no joints or seams.

In one or more forms, described herein is an assembly comprising: a central housing having an epitrochoidally shaped inner surface; and front and rear side plates flanking the central housing, wherein when formed the assembly includes at least one inner chamber, wherein each of the housing, the front side plate and the rear side plate, all such parts containing no cooling channels, are made of a ceramic material wherein said ceramic material is monolithic, that is forms a contiguous mass with no joints or seams, wherein the said monolithic ceramic material is formed by incorporating a stabilizing oxide into the monoclinic crystalline form of zirconium dioxide (also known as zirconia) such that the stabilizing oxide goes into solid solution in the monoclinic zirconia crystal lattice. Said ceramic material to be referred to as an oxide stabilized zirconia.

The oxide stabilized zirconia as described herein possesses a thermal conductivity of about or less than about 100 BTU·in/ft$^2$·hr·° F. at room temperature (about or less than about 14.4 W/m·° K at room temperature), wherein the stabilizing oxide may be either cerium oxide or magnesium oxide wherein the assembly is sustainably operable when assembled without a fluid cooling element or an external fluid cooling system. The ceramic material (oxide stabilized zirconia) may be a particular composition of monolithic cerium oxide stabilized zirconia containing at or about 12-14% cerium oxide in solid solution. It may also be a particular composition of monolithic cerium oxide stabilized zirconia containing at or about 13.5±0.5 wt. % cerium oxide in solid solution. The ceramic material may also be a particular composition of monolithic magnesium oxide stabilized zirconia containing at or about 2.5-3.5 wt. % magnesium oxide in solid solution. It may also be a particular composition of monolithic magnesium oxide stabilized zirconia containing at or about 3.175±0.175 wt. % magnesium oxide in solid solution. With the desired material and when fabricated into the desired shape and/or part, it may possess a thermal conductivity of about or less than about 100 BTU·in/ft$^2$·hr·° F. at room temperature (about or less than about 14.4 W/m·° K at room temperature). The zirconia part when fabricated into the desired shape may possess a thermal conductivity of at or about 13.9 BTU·in/ft$^2$·hr·° F. at room temperature (at or about 2 W/m·° K at room temperature).

The powder form of the cerium oxide stabilized zirconia described herein, from which the zirconia part may be fabricated, often has a surface area of about 7 m$^2$g$^{-1}$ and a median particle size diameter ($D_{50}$) of about 0.60 to about 0.70 microns and a $D_{80}$ of about 0.80 to 1.20 microns (where $D_{50}$ refers to the spherical particle diameter for which 50% of the particles have a smaller equivalent spherical diameter and $D_{80}$ refers to the spherical particle diameter for which 80% of the particles have a smaller equivalent spherical diameter).

The powder form of the magnesium oxide stabilized zirconia described herein, from which the zirconia part may be fabricated, often has a surface area of about 5 m$^2$g$^{-1}$ and a median particle size diameter ($D_{50}$) of about 0.60 to 1.38 microns and $D_{80}$ of about 1.77 to 2.60 microns.

Also described herein is an internal combustion rotary engine comprising a housing having an epitrochoidally shaped inner surface and front and rear side plates flanking the housing; and a trochoidally shaped rotor configured to fit within the epitrochoidally shaped housing, wherein each of the front side plate, rear side plate, the housing and the rotor, all such parts containing no cooling channels, are produced from a ceramic composition comprising a monolithic zirconia ceramic material incorporating a stabilizing oxide in solid solution as described herein, wherein the said ceramic material possessing a thermal conductivity of about or less than about 100 BTU·in/ft$^2$·hr·° F. at room temperature (about or less than about 14.4 W/m·° K at room temperature), wherein the stabilizing oxide may be either cerium oxide or magnesium oxide, wherein the ceramic internal combustion rotary engine, when assembled with said oxide stabilized zirconia engine parts, is sustainably operable without a substantial cooling element or an external fluid cooling system and also does not have to supply power to cool the engine or to pump water through an external water jacket or through internal cooling channels. The ceramic material (oxide stabilized zirconia) may be a particular composition of monolithic cerium oxide stabilized zirconia containing at or about 12-14% cerium oxide in solid solution wherein said ceramic material possessing a thermal conductivity of about 13.9 BTU·in/ft$^2$·hr·° F. at room temperature (about 2 W/m·° K at room temperature). The ceramic material may also be a particular composition of monolithic cerium oxide stabilized zirconia containing about 13.5±0.5 wt. % cerium oxide in solid solution wherein said ceramic material possessing a thermal conductivity of about 13.9 BTU·in/ft$^2$·hr·° F. at room temperature (about 2 W/m·° K at room temperature). The ceramic material may also be a particular composition of monolithic magnesium oxide stabilized zirconia containing at or about 2.5-3.5 wt. % magnesium oxide in solid solution wherein said ceramic material possessing a thermal conductivity of about 13.9 BTU·in/ft$^2$·hr·° F. at room temperature (about 2 W/m·° K at room temperature). The ceramic material may also be a particular composition of monolithic magnesium oxide stabilized zirconia containing about 3.175±0.175 wt. % magnesium oxide in solid solution wherein said ceramic material possessing a thermal conductivity of about 13.9 BTU·in/ft$^2$·hr·° F. at room temperature (about 2 W/m·° K at room temperature). The monolithic zirconia engine part incorporating a stabilizing oxide in solid solution when fabricated may possess a thermal conductivity of about 13.9 BTU·in/ft$^2$·hr·° F. at room temperature (about 2 W/m·° K at room temperature). The zirconia engine part when fabricated may be one that possesses a thermal conductivity of about or less than about 100 BTU·in/ft$^2$·hr·° F. at room temperature (about or less than about 14.4 W/m·° K at room temperature). The ceramic internal combustion rotary engine, when assembled with said oxide stabilized zirconia engine parts, achieves a lower rate of heat rejection as compared to an entirely metal internal combustion engine whose housing, rotor, front and rear side plates, are all made from metal. In addition the said ceramic internal combustion rotary engine operates at a temperature in excess of a temperature that would cause the metal parts of a metal engine to either lose strength and/or lose structural and mechanical integrity or suffer extensive oxidation or corrosion and thus fail.

Further described herein is an internal combustion rotary engine comprising a housing having an epitrochoidally shaped inner surface, the housing comprising a central element with a front side plate and a rear side plate flanking the central element; and one trochoidally shaped rotor and/or more than one trochoidally shaped rotor per housing/front side plate/rear side plate configured to fit engagingly within the central element, wherein when formed the internal combustion rotary engine includes at least one inner chamber, wherein each of the central element, front side plate, rear side plate and rotor, all such parts containing no cooling channels, are fabricated from a monolithic zirconia ceramic incorporating a stabilizing oxide in solid solution as described herein with said ceramic material possessing a thermal conductivity of about or less than about 100 BTU·in/ft$^2$·hr·° F. at room temperature (about or less than about 14.4 W/m·° K at room temperature), wherein the stabilizing oxide may be either cerium oxide or magnesium oxide described herein, wherein the ceramic internal combustion rotary engine, when assembled with said oxide stabilized zirconia engine parts, is sustainably operable without a substantial cooling element or an external fluid cooling system and also does not have to supply power to cool the engine or to pump water through an external water jacket or through internal cooling channels. In addition the ceramic internal combustion rotary engine when formed operates at a temperature in excess of a temperature that would cause the metal parts of an entirely metal engine to either lose strength and/or lose structural and mechanical integrity or suffer extensive oxidation or corrosion and thus fail.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DESCRIPTION

Figures 1, 2, 2A, 3, 4, 5, 6:
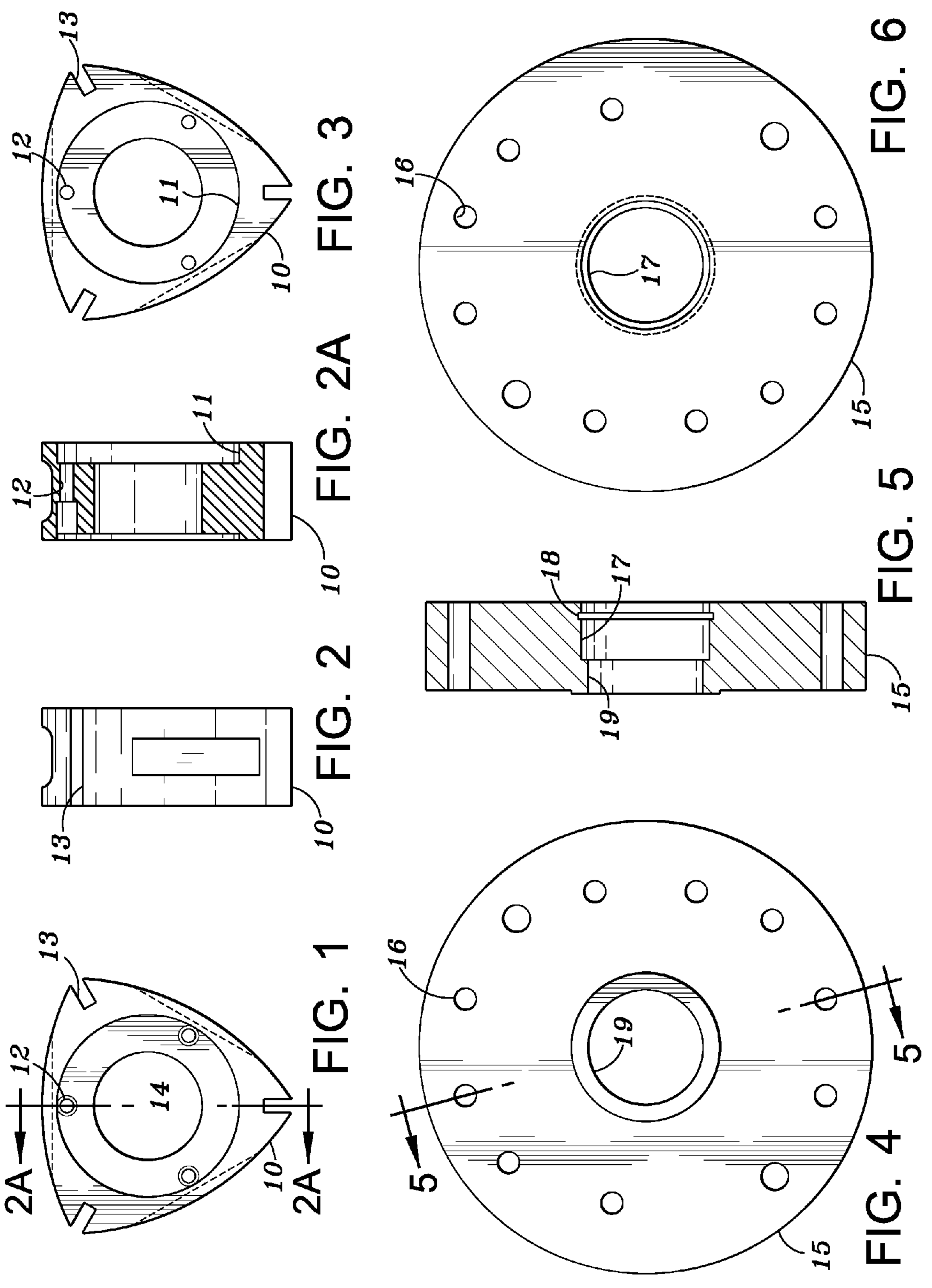
FIG. 1 depicts a front view of a representative rotor described herein.
FIG. 2 depicts a side view of the representative rotor of FIG. 1.
FIG. 2A depicts a cross-sectional view of FIG. 1 taken at line 2A.
FIG. 3 depicts a rear view of the representative rotor of FIG. 1.
FIG. 4 depicts a front view of a representative front plate described herein.
FIG. 5 depicts side view of the representative front plate of FIG. 4.
FIG. 6 depicts a rear view of the representative front plate of FIG. 4.
Figure 9:
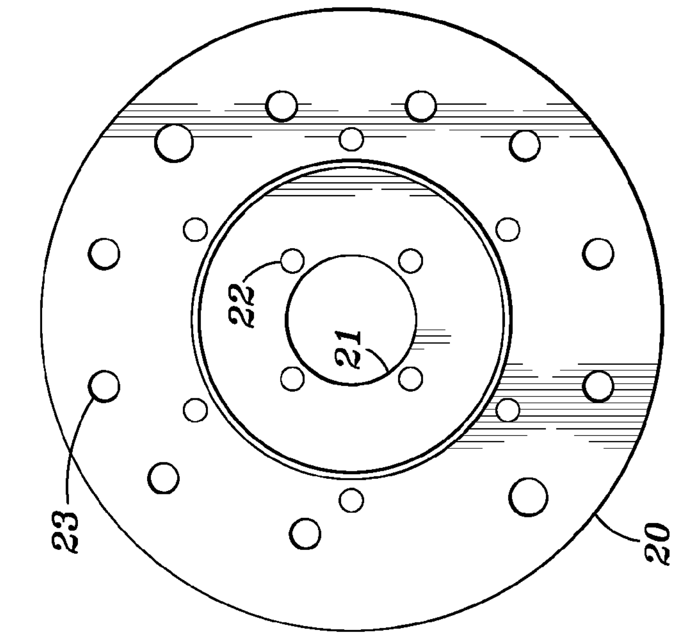
FIG. 9 depicts a rear view of the representative rear plate of FIG. 7.
Figure 8:
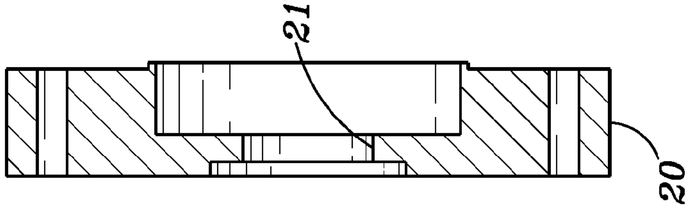
FIG. 8 depicts side view of the representative rear plate of FIG. 7.

In the description which follows like assembly or engine parts are marked throughout the specification and drawing with the same reference numerals respectively. The drawing figures are not necessarily to scale and certain features may be shown in generalized or schematic form in the interest of clarity and conciseness or for informational purposes.

While engineering (or structural) ceramics have been considered good candidates for IC engines because they have tolerable mechanical strength and good structural integrity coupled with melting points higher than 2900 F (1600 C), internal combustion engines made from such ceramics have remained inferior. Some may be able to operate at higher temperatures resulting in higher thermodynamic efficiencies of the fuel combustion process. These include silicon nitride, silicon carbide and zirconia. However, silicon based ceramics and some zirconia ceramics suffer from hydrothermal degradation in the hot, humid and corrosive environment of the IC engine which causes the ceramic to degrade and lose their mechanical strength and structural integrity over a relatively short operating time.

Among the zirconia ceramics that do not undergo hydrothermal degradation are cerium oxide stabilized zirconia and magnesium oxide stabilized zirconia. However, without being bound by theory it is believed that, as disclosed herein, a particular chemical composition of cerium oxide stabilized zirconia and of magnesium oxide stabilized zirconia would meet all four properties for an ideal material for an IC engine.

A particular advantage of the zirconia family of ceramics is their low thermal conductivity, which mean a zirconia ceramic engine (as described herein) will retain more heat inside its combustion chamber and a zirconia ceramic engine (as described herein) does not require fluid cooling resulting in much higher thermal efficiencies than metal engines.

It is noted that zirconia is another name for the chemical compound zirconium dioxide which is made up of two chemical elements zirconium and oxygen. Therefore throughout the document, the words "zirconium dioxide" and "zirconia" may be used interchangeably. The reference to zirconia as described herein is considered a ceramic, possessing a low thermal conductivity of about 13.9 BTU·in/ft$^2$·hr·° F. at room temperature (about 2 W/m·° K at room temperature).

By contrast, zirconium is a single chemical element and a metal and is not considered a ceramic. Zirconium possesses a high thermal conductivity of about 157.8 BTU·in/ft$^2$·hr·° F. at room temperature (or 22.7 W/m·° K at room temperature). Zirconium's thermal conductivity is even higher than steel. Zirconium is, thus, not an ideal engine material.

Figure 12:
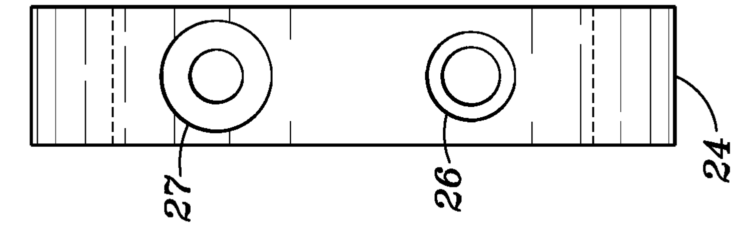
FIG. 12 depicts a rear view of the representative housing of FIG. 10.
Figure 13:
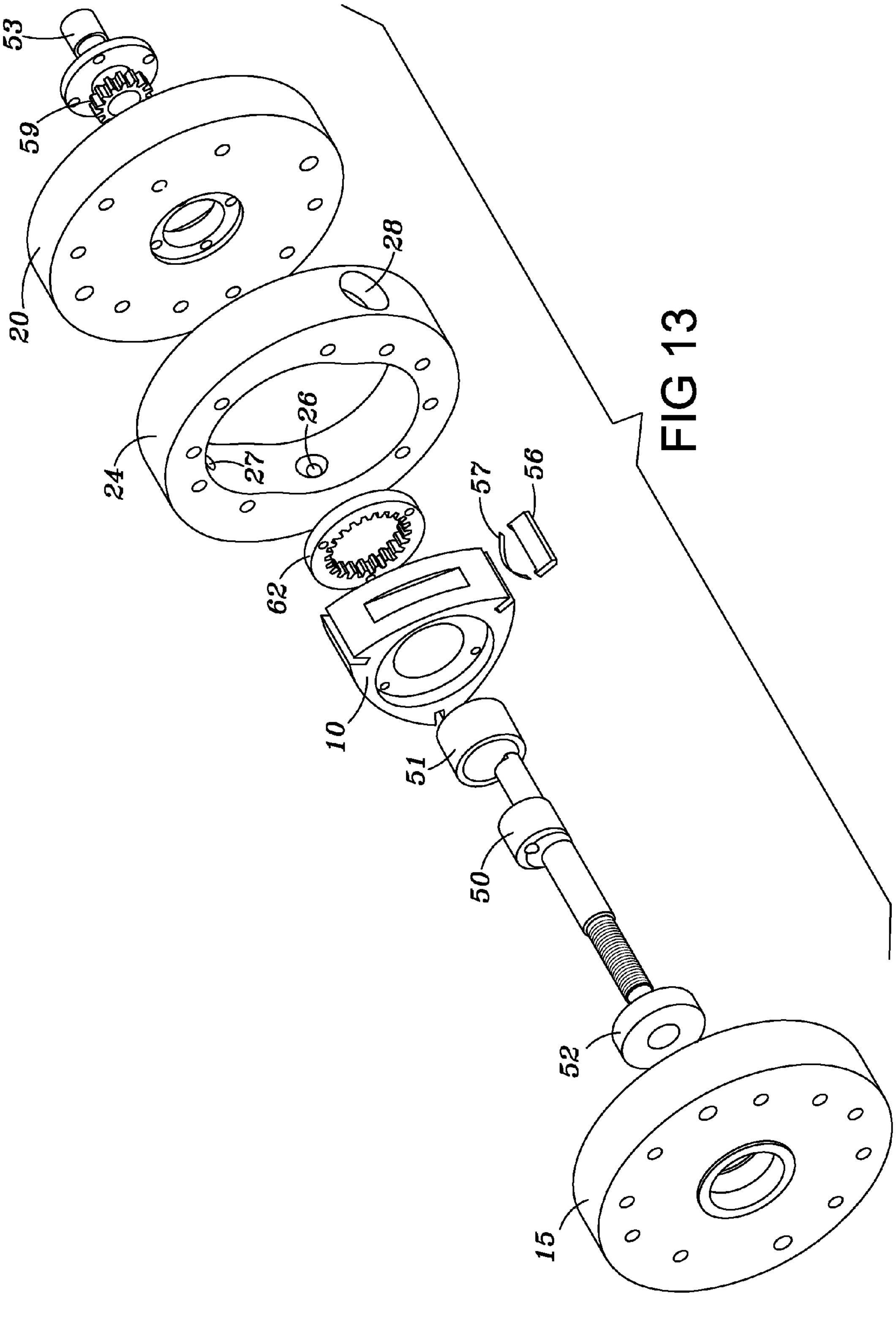
FIG. 13 depicts an exploded perspective view of a representative internal combustion rotary engine described herein.

As will be described herein, an internal combustion rotary engine operative without cooling channels and/or cooling fins and/or a water jacket is provided. The engine includes one or more rotors having a trochoidally shaped profile, central housings having an epitrochoidally shaped profile and flanked by front and rear side plates, as well as an intake port, an exhaust port, and optionally one or more plug ports associated with the housing. In operation, there is an eccentric motion of a central shaft driven by movement of the rotor maintained within the housing, front and rear side plates. Representative views of a rotor 10, front plate 15, rear plate 20 and housing 24 are depicted in FIGS. 1-12. A representative illustration of such an engine in an exploded view is depicted in FIG. 13.

Figure 11:
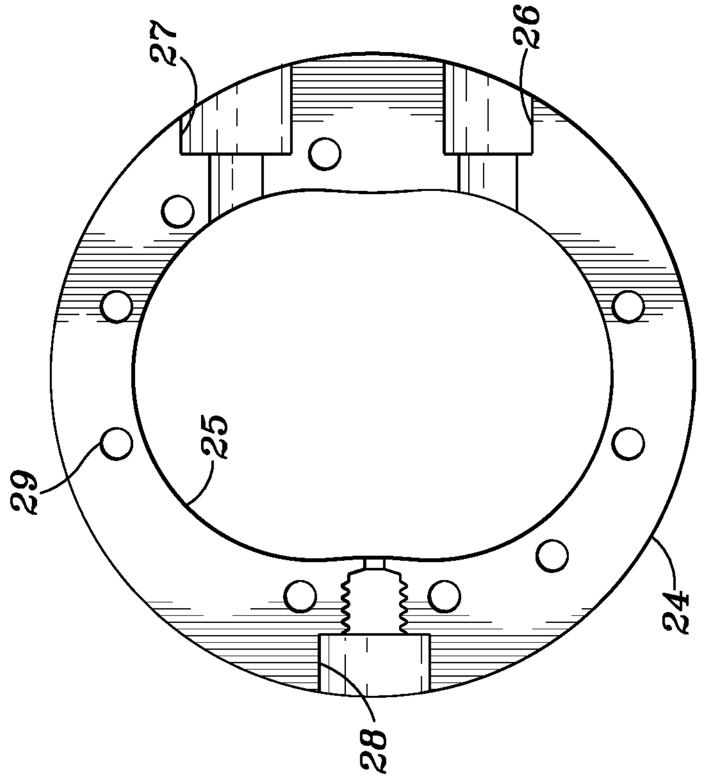
FIG. 11 depicts side view of the representative housing of FIG. 10.
Figure 10:
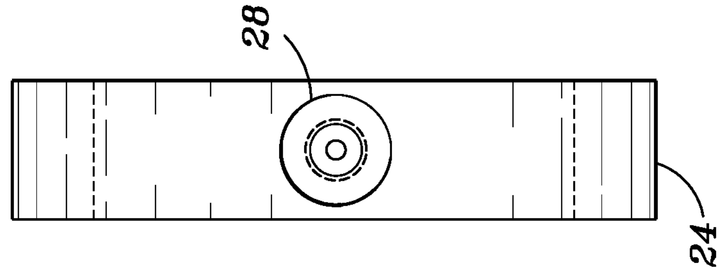
FIG. 10 depicts a front view of a representative housing described herein.

As depicted, the rotor 10 has a triangular shaped or trochoidal shaped profile with each side edge outwardly bowed between each apex (FIGS. 1-3). The rotor is engagingly positioned in housing 24, which has an epitrochoidally shaped profile on its inner surface 25 (FIGS. 10-12). Through a central cavity portion 14 of the rotor, supported by bearings 51, 52, 53, is a central shaft or eccentric shaft 50. Internal gears 59, 62, associated with the rotor, directs movement of the rotor within the housing with respect to the central shaft, such that gear 59, a fixed gear, is proximate the central shaft and cooperative with outer gear 62, which is configured for a cooperative fitting with the rotor via a countersunk recessed portion 11 and bores 12. At each apex of the rotor is a groove 13 for cooperative fitting and engagement with an apex seal 56. Each apex seal may be accompanied with a seal spring 57 or the like for biasing the seals into engaging sealingly with the internal wall of the housing. As such, the apex seal presents a sealed engagement between apexes of the rotor and the internal periphery of the housing, thereby providing three combustion chambers in the housing.

The housing 24 is bounded on its two sides by side plates 15 and 20. Side plate 15 is further illustrated in FIGS. 4-6, which includes recessed portions 17 and 19, groove 18 and bores 16, which may or may not be threaded. Bearing 52 is positioned in recessed portion 17 to support one end of the eccentric shaft 50 and is secured in place by a retaining clip in groove 18. The other end of the eccentric shaft 50 is supported by the rear side plate 20. Side plate 20 is further illustrated in FIGS. 7-9, and includes recessed portions 21 and bores 22 and 23, which may or may not be threaded. A centermost recess 21 of side plate 20 is cooperative with fixed gear 59, which is secured to side plate 20 by fasteners in bores 22. Bores 22 provide fixed positioning of gear 59 with respect to side plate 20. The positioning allows gear 59 to mesh with the gear 62 when the engine is assembled. In the center of the gear 59 is a bore to accept a rear needle bearing 53 for supporting the rear portion of the eccentric shaft 50. One or more bores 16 and one or more bores 23 are cooperative with properly aligned bores 29 of the housing. The series of bores (16, 23 and 29) accommodate fasteners, such as screws, bolts and/or dowel pins, to secure and position the side plates (15 and 20) on either side of the housing. The housing 24 further comprises an inlet port 26 and an outlet port 27 in addition to a separate port 28. Port 26 will generally be configured for injection of a fuel, such as via a carburetor, or fuel injector or an alternative device to introduce and/or control the inlet fluid. Port 27 generally be configured for an exhaust source, such as a muffler or the like. In some embodiments, port 28 accommodates a combustion initiation aid, such as a glow plug or a spark plug or fuel injector or the like when appropriate.

Final assembly of an engine described herein includes installation of appropriate fasteners through the side plates (15, 20) and housing 24 to form a sealed unit. Appropriate counter-weights are attached to the assembly to balance rotating parts. In addition, accompanying elements, such as a drive washer positioned in recess 19 with a rear thrust washer may be used to mount additional components to the eccentric shaft such as a propeller, pulley wheel, chain drive, or gear box.

Each of the rotor 10, front side plate 15, rear side plate 20 and housing 24 is made without fluid cooling channels and/or without cooling fins. In addition, each of said rotor, front side plate, rear side plate and housing may be made of the oxide stabilized zirconia ceramic parts described herein. Thus, suitable ceramic assembly or engine parts are monolithic zirconia. Each, when formed as an oxide stabilized zirconia ceramic part, is capable of operating at an elevated temperature that would cause the metal parts of a metal engine to deform, and/or to lose strength and/or to lose structural and mechanical integrity and fail.

The oxide stabilized zirconia ceramic rotor does not require any fluid cooling channels, the oxide stabilized zirconia ceramic front and rear side plates do not require fluid cooling channels or cooling fins, and the oxide stabilized zirconia ceramic housing does not require fluid cooling channels or cooling fins. The oxide stabilized zirconia ceramic housing also does not require a fluid cooling jacket. The ceramic engine, itself, when assembled, does not have to supply power to cool the engine, which by contrast is essential for any metallic engine where some of the generated power is required to pump water or oil through an external water/oil jacket or through the fluid cooling channels to cool the metal engine parts.

The improved configurations described herein are possible through use of a material composition selected for making each of any of said engine parts, which is a composition formed from a ceramic raw material in powder form. The ceramic part, when fabricated, possesses a low thermal conductivity and is able to operate at temperatures in excess of 1650 F (900 C). The oxide stabilized zirconia ceramic part when formed possesses a thermal conductivity about or less than about 100 BTU·in/ft$^2$·hr·° F. at room temperature (about or less than about 14.4 W/m·° K at room temperature). In some embodiments, the thermal conductivity of the oxide stabilized zirconia part is less than or about 13.9 BTU·in/ft$^2$·hr·° F. at room temperature (about 2 W/m·° K at room temperature).

Zirconia ceramics have very high melting points, generally greater than 2900° F. (1600° C.), thereby providing a significantly higher operating temperature for the engine, when formed with said material, as compared with an engine made entirely of metal parts.

In one or more embodiments, the ceramic assembly part or engine part is a monolithic oxide stabilized zirconia. In some embodiments, a monolithic oxide stabilized zirconia as the ceramic engine part is one that possesses a thermal conductivity of less than or about 100 BTU·in/ft$^2$·hr·° F. at room temperature (less than or about 14.4 W/m·° K at room temperature). In one or more embodiments, a monolithic oxide stabilized zirconia possesses a thermal conductivity of about 13.9 BTU·in/ft$^2$·hr·° F. at room temperature (about 2 W/m·° K at room temperature) which may be used as the ceramic engine part.

Pure zirconium dioxide, also known as zirconia, is not suitable as a ceramic assembly or ceramic engine part when associated with a combustion chamber of the engine described herein because of its crystalline structure. Upon heating, the crystalline structure changes from monoclinic to a cubic/tetragonal form with an accompanying volume change (shrinkage). Although this change is reversible, on cooling it forms a hysteresis loop which eventually results in one or more fractures in the zirconia part.

To control crystalline structure changes, a particular stabilizing oxide has been incorporated into the monoclinic zirconia crystal lattice to form a solid solution resulting in a monolithic oxide stabilized zirconia as described previously. The ceramic assembly or ceramic engine part is fabricated from such a monolithic oxide stabilized zirconia using either cerium oxide or magnesium oxide as the stabilizing oxide incorporated into the monoclinic zirconia crystal lattice. The particular cerium and magnesium oxides confer toughness, wear resistance, strength at one or move given temperatures, thermal shock resistance and corrosion resistance on the finished ceramic assembly or ceramic engine part. The amount of cerium oxide in the oxide stabilized zirconia ceramic assembly part or ceramic engine part is generally at or about 12-14 wt. % cerium oxide or may be at or about 13.5±0.5 wt. %. The amount of magnesium oxide in the oxide stabilized zirconia ceramic assembly part or ceramic engine part is generally at or about 2.5-3.5 wt. % or may be at or about 3.175±0.175 wt. %.

The cerium oxide or magnesium oxide (as a stabilizing oxide) is generally incorporated into the monoclinic zirconia crystal lattice to form a solid solution in one of the ways described. (A) Co-precipitation of water soluble salt of the cerium oxide or magnesium oxide in the case of chemically derived zirconia(s), followed by sintering, comminution and sizing as required. A suitable manufacturer relying on such a technique includes American Elements Inc, California, Tosoh Corporation, Japan and Daiichi Kigenso Kagaku Kogyo Company Ltd, Japan. (B) Electro-refining (fusion) of the cerium oxide or magnesium oxide with the zirconia followed by comminution and sizing. A suitable manufacturer relying on such a technique includes UCM Advanced Ceramics GmbH, Germany. (C) Sintering the cerium oxide or magnesium oxide in situ at a very high temperature, then grinding and sizing.

The assembly or engine described herein may include one or more of a ceramic parts such that the ceramic part is fabricated or produced entirely of the described material composition, that is a monolithic cerium oxide stabilized zirconia or a monolithic magnesium oxide stabilized zirconia as described herein. The assembly or engine part produced of said ceramic material includes the rotor (including its countersunk circular recess, bores, and apex grooves), the front side plate (including bores, grooves and recessed portions), the rear side plate (including bores and recessed portions) and/or the housing (including its epitrochoidal-like or epitrochoidally-shaped inner surface, ports and bores). These parts may each be described as a monolithic cerium oxide stabilized zirconia ceramic material or a monolithic magnesium oxide stabilized zirconia material.

The high melting point of the described ceramic material as well as its low thermal conductivity and corrosion resistance allows an internal combustion rotary engine described herein, when assembled with one or more parts made of said ceramic materials, to be more fuel efficient. In addition, said rotary engine described herein, when assembled with parts made of said ceramic materials will function with a greater range of fuel sources. Furthermore, said rotary engine described herein when assembled with parts made of said ceramic materials operate without supplying power to fluid cool the engine. Moreover, said rotary engine described herein, when assembled with parts made of said ceramic materials operate at higher temperatures than that of an engine with said parts that are made of metal. Furthermore, said rotary engine described herein when assembled with parts made of said ceramic materials retain more heat inside its combustion chamber and is thereby a more efficient engine.

In one or more embodiments, a monolithic cerium oxide stabilized zirconia containing at or about 12-14 wt. % cerium oxide or containing at or about 13.5±0.5 wt. % cerium oxide in solid solution may be used as the ceramic material for fabricating some or all of the rotor, housing front side plate and rear side plate of said engine described herein. The ceramic powder which the ceramic parts were made generally has a surface area of about 7 $m^2g^{-t}$ and a median particle size diameter ($D_{50}$) of about 0.60 to about 0.70 microns and $D_{80}$ of about 0.80 to 1.20 microns.

In further embodiments, a monolithic magnesium oxide stabilized zirconia containing at or about 2.5-3.5 wt. % or containing at or about 3.175±0.175 wt. % magnesium oxide in solid solution may be used as the ceramic material for fabricating some or all of the rotor, housing, front side plate and rear side plate of said engine described herein. The powder from which the ceramic parts were made generally has a surface area of about 5 $m^2g^{-1}$ and a median particle size diameter ($D_{50}$) of about 0.60 to 1.38 microns and $D_{80}$ of about 1.77 to 2.60 microns.

In one or more embodiments, each of the ceramic parts of said engine described herein (rotor, housing, front side plate and rear side plate) may be made of either monolithic cerium oxide stabilized zirconia containing at or about 12-14 wt. % cerium oxide or containing at or about 13.5±0.5 wt. % cerium oxide in solid solution or monolithic magnesium oxide stabilized zirconia containing at or about 2.5-3.5 wt. % or containing at or about 3.175±0.175 wt. % magnesium oxide in solid solution. The resulting engine could be a mix of cerium oxide stabilized zirconia ceramic parts and magnesium oxide stabilized zirconia ceramic parts.

Optionally, in addition to the rotor, housing, front side plate and rear side plate, additional parts of said engine may be made of a ceramic material or may be made of a material composition comprising a ceramic constituent. As an alternative, said additional parts may be made of a ceramic or a metal or a polymer or combinations thereof. These additional parts include the eccentric shaft, rotor bearings, front and rear side plate bearings, rotor apex seal, rotor apex seal spring, internal gears, and accompanying parts including but not limited to drive washer, rear thrust washer, combustion initiation aid, retaining clip, fasteners (such as machine screws, bolts, washers, nuts), pins and dowels or additional parts for ensuring alignment (used as alignment aids).

Figure 7:
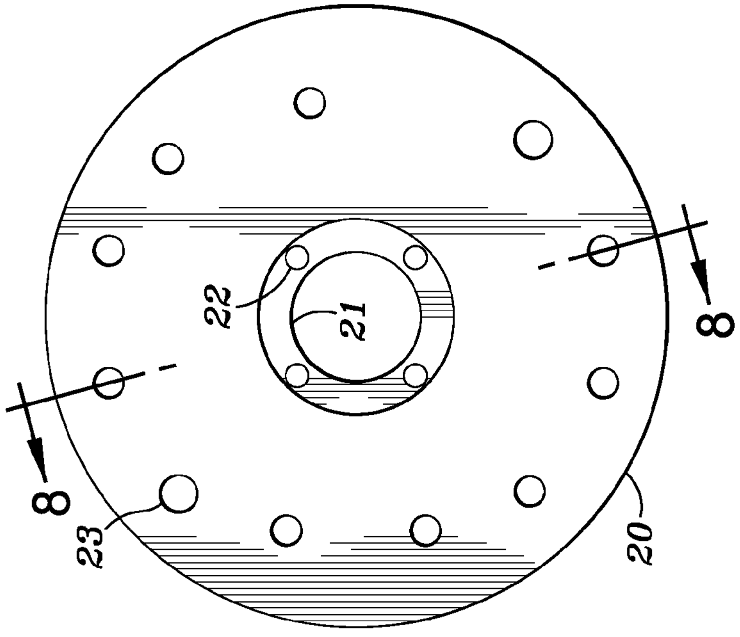
FIG. 7 depicts a front view of a representative rear plate described herein.

In one or more embodiments, metal parts of the described ceramic engine include the internal gear ring 62 mounted in bore 11 and secured by screws in bores 12 (FIGS. 3, 13). In addition, apex seals 56 and seal springs 57 may be metal, each being freely mounted in grooves 13 at each apex of the ceramic rotor 10 (FIGS. 1, 13). In addition, a rotor needle bearing 51 is metal (which is mounted in bore 11 allowing the rotor to rotate inside the ceramic housing 24 on a metal eccentric shaft 50, which extends through the ceramic side plates 15 and 20) (FIGS. 4, 7, 13).

When formed with the ceramic parts, a rotary engine described herein does not require any cooling channels or cooling fins and does not need a fluid jacket to keep it cool. By fabricating the entire said engine (rotor including its countersunk circular recess, bores, and apex grooves, the whole front side plate including bores, grooves and recessed portions, the whole rear side plate including bores and recessed portions, and the whole housing including its epitrochoidal-like or epitrochoidally-shaped inner surface, ports and bores) from said monolithic oxide stabilized zirconia ceramic materials, the finished rotary engine will operate at very high temperatures (temperatures greater than 1652° Fahrenheit or 900° Celsius), including temperatures that are likely to cause the metal parts of a metal engine to deform, and/or to lose strength and/or to lose structural and mechanical integrity or lead to excessive oxidation/corrosion and fail. In addition, said rotary engine described herein, when assembled with parts made of the described ceramic materials will be capable of operating at said high temperatures and will function with a greater variety and range of fuels (liquid or gas). It is at such or greater temperatures that hydrocarbon fuels burn more thermodynamically efficiently. It is known that cast iron, steel or aluminum internal combustion engines are not capable of operating at temperatures greater than 2200° F. (1200° C.) without its parts deforming or losing its structural or mechanical integrity.

In a first example, a rotor, a housing, a front side plate and a rear side plate of an internal combustion rotary engine were each made from a monolithic ceramic material, such that each part (rotor, housing, front side plate and rear side plate) was wholly ceramic and the ceramic for each part was fabricated using a cerium oxide stabilized zirconia containing 13.5±0.5 wt. % cerium oxide. The powder, from which said ceramic parts were mad; generally has a surface area of about 7 $m^2g^{-1}$ and a median particle size diameter ($D_{50}$) of about 0.60 to about 0.70 microns and $D_{80}$ of about 0.80 to 1.20 microns. The cerium oxide stabilized zirconia parts possessed a thermal conductivity of about 13.9 BTU·in/ft$^2$·hr·° F. at room temperature (about 2 W/m·° K. at room temperature). None of the ceramic parts of said rotary engine (the housing, the front side plate, the rear side plate or the rotor) included a cooling element such as cooling fins, fluid cooling channels, or a fluid cooling jacket. The remaining parts of the assembled engine were either aluminum or steel. For example the central gear and central shaft of the ceramic rotor were made of steel. The use of metal parts in the said engine was made possible by the ceramic engine parts made from a low thermal conductivity zirconia ceramic material, shielding the metal parts from the intense heat of the engine. For example, the low thermal conductivity ceramic rotor thermally shielded the metal gear and metal shaft from the intense heat generated in the combustion chamber of the engine. Any heat that may leak towards the metal gear and metal shaft, could, if necessary be cooled using conventional techniques (such as by blowing air through a channel bored in the central shaft). Fortunately, the high thermal conductivity of the metal gear and metal shaft resulted in speedy heat dissipation and cooling of the metal parts. It was possible to use metal bolts and metal screws in the said engine because they were also shielded by the mass of low thermal conductivity zirconia ceramic material surrounding them. Metal bolts held the low thermal conductivity zirconia ceramic front and rear side plates to the low thermal conductivity zirconia ceramic housing. Metal screws secured the metal central gear to the low thermal conductivity zirconia ceramic rotor. The washers and race bearing were also metal. In addition, the balance mechanisms were metal (including the metal weights at the rear end of the metal central shaft). Metallic alloy apex seals and springs, designed to survive at high temperatures, were employed. It is also suitable to use ceramic seals and springs.

In a second example, a rotor and front and rear side plates of an internal combustion rotary engine were made from a monolithic cerium oxide stabilized zirconia and the housing was made from a monolithic magnesium oxide stabilized zirconia. Each part (rotor, front side plate, rear side plate and housing) was wholly ceramic. The parts made with a cerium oxide stabilized zirconia contained 13.5±0.5 wt. % cerium oxide, in which the particles of the cerium oxide stabilized zirconia powder generally has a surface area of about 7 $m^2g^{-1}$ and a median particle size diameter ($D_{50}$) of about 0.60 to about 0.70 microns and $D_{80}$ of about 0.80 to 1.20 microns. The cerium oxide stabilized zirconia engine parts possessed a thermal conductivity of about 13.9 BTU·in/ft$^2$·hr·° F. at room temperature (about 2 W/m·° K at room temperature). The housing was a monolithic magnesium oxide stabilized zirconia ceramic that contained 3.175±0.175 wt. % magnesium oxide, in which the particles of the magnesium oxide stabilized zirconia powder has a surface area of about 5 $m^2g^{-1}$ and a median particle size distribution ($D_{50}$) of about 0.60 to 1.38 microns and $D_{80}$ of about 1.77 to 2.60 microns. The magnesium oxide stabilized zirconia engine housing possessed a thermal conductivity of about 13.9 BTU·in/ft$^2$·hr·° F. at room temperature (about 2 W/m·° K at room temperature). None of the housing, the front side plate, the rear side plate or the rotor of this engine included a cooling element (such as cooling fins, water cooling channels) or a fluid cooling jacket. The remaining parts of the assembled engine were either aluminum or steel. For example the central gear and central shaft of the ceramic rotor were made of steel. The use of metal parts in the said engine was made possible by the ceramic engine parts made from a low thermal conductivity zirconia ceramic material, shielding the metal parts from the intense heat of the engine. For example the low thermal conductivity ceramic rotor thermally shielded the metal gear and metal shaft from the intense heat generated in the combustion chamber of the engine. Any heat that may leak towards the metal gear and metal shaft, could, if necessary be cooled using conventional techniques (such as by blowing air through a channel bored in the central shaft). Fortunately, the high thermal conductivity of the metal gear and metal shaft resulted in speedy heat dissipation and cooling of the metal parts. It was possible to use metal bolts and metal screws in the said engine because they were also shielded by the mass of low thermal conductivity zirconia ceramic material surrounding them. Metal bolts held the low thermal conductivity zirconia ceramic front and rear side plates to the low thermal conductivity zirconia ceramic housing. Metal screws secured the metal central gear to the low thermal conductivity zirconia ceramic rotor. The washers and race bearing were also metal. In addition, the balance mechanisms were metal (including the metal weights at the rear end of the metal central shaft). Metallic alloy apex seals and springs, designed to survive at high temperatures, were employed. It is also suitable to use ceramic seals and springs.

Tests were run on the ceramic engine with the cerium oxide stabilized zirconia ceramic housing and the ceramic engine with the magnesium oxide stabilized zirconia ceramic housing. Both assembled ceramic engines, in turn, were attached to a rigid frame for the controlled tests.

The tests were performed in ambient air using a high performance fuel used for model aircraft engines (from Wildcat Fuels Inc, Kentucky), which contains 15% nitromethane and 16% oil (80% synthetic oil and 20% racing castor oil). A voltage of 1.5 V was applied to a glow plug located in port 28 of the housing to initiate ignition of the fuel (see FIG. 13). The voltage was applied until the engine began firing. A 12V electric starter motor capable of running at 2500 revolutions per minute was coupled to a propeller cone by friction to rotate the ceramic rotor in order to initiate the internal combustion process; the propeller cone was attached to the central eccentric shaft. The fuel/air mixture was controlled using a carburetor with a needle valve. The apex seals and springs were made of a steel alloy purchased "off the shelf". The seals and springs may also be made of other materials such as silicon nitride or a low thermal expansion alloy (e.g., INVAR, registered by Imphy Alloys France) for improved durability at higher temperatures.

Comparative tests were carried out between the ceramic rotary engine described herein (assembled as just described with the rotor, housing, front and rear side plates, each made with the described monolithic oxide stabilized zirconia ceramic) and an equivalent* commercially available rotary engine made entirely out of metal (*having the same swept volume). A difference in the exhaust temperature of the two engines was found. The temperature was 165° F. (74° C.) for the ceramic rotary engine described herein as compared with 248° F. (120° C.) for the rotary engine made entirely out of metal. It could be concluded that the exhaust of the described ceramic engine contained less burning fuel than its metal counterpart. This conclusion suggests the following: (a) that more fuel was burned inside the described ceramic rotary engine because more heat was retained inside the described ceramic engine to burn fuel more completely and (b) there was less unburnt fuel in the exhaust because the ceramic combustion chamber wall was uncooled and remained hot preventing a cool fuel-quenching zone from forming.

During the assembly of any of the ceramic rotary engines described herein, all parts were visually inspected and no visible defects or flaws were found.

In many embodiments, the described engine comprising a ceramic body (fully ceramic housing, ceramic front side plate and ceramic rear side plate) and a ceramic rotor will have substantially reduced heat loss to the outside, and instead retaining heat inside its combustion chamber.

Further modifications to the described engine may include adjusting the number of rotors, housings and side plates; adjusting the size and power output by adding more than one engine described herein in a modular design; adjusting the mix of ceramic parts; adding a heat exchanger (such as in a motor vehicle to heat the cabin); coupling the described engine with another device or machine; adding a turbocharger converting rotary motion (torque force) into another form of energy (such as electricity, compressed air, hydraulic power, such as for water pumped to a cooling tower, standby coolers, storing the water as a source of potential energy); adding a battery/generator system to create a hybrid power unit; adding an electrolysis unit to generate hydrogen or other combustible fluid, which could operate at different times in the load/use cycle; for fork lift trucks; or as a power unit for truck mounted cranes and hoists and the like; or for operating a compressor; and/or adding an auxiliary power unit (such as for refrigerated trailers, shipping containers, standby generators, compressors and the like, or for an aircraft as a starter motor for its gas turbine engines).

Although representative engines and components have been described in detail herein, those skilled in the art will recognize various substitutions and modifications that may be made without departing from what is described and shown as well as defined by the appended claims.

What is claimed is:

1. A monolithic ceramic assembly comprising:

a central housing containing no fluid cooling channels and having an epitrochoidally shaped inner surface; and a front side plate and a rear side plate, both containing no fluid cooling channels and each flanking the central housing, the monolithic ceramic assembly when formed including at least one inner chamber, each of the central housing, the front side plate and the rear side plate being made of a ceramic material that is a monolithic oxide stabilized zirconia, the monolithic oxide stabilized zirconia being made from a powder in which the oxide is one of cerium oxide and magnesium oxide, such that when the monolithic oxide stabilized zirconia is a cerium oxide stabilized zirconia, the powder has a surface area of about 7 $m^2g^{-1}$ and a first median particle size distribution with 50% of particle size diameters in a range from about 0.60 to about 0.70 microns and when the monolithic oxide stabilized zirconia is a magnesium oxide stabilized zirconia, the powder has a surface area of about 5 $m^2g^{-1}$ and a first median particle size distribution with 50% of particle size diameters in a range from about 0.60 to about 1.38 microns, the ceramic material having only one stabilizing oxide incorporated in a monoclinic crystalline lattice, the only one stabilizing oxide selected from one of cerium oxide in an amount greater than 12 wt % and up to about 14 wt %, and magnesium oxide in an amount greater than about 2.5 wt % and up to about 3.5 wt %, said ceramic material having the only one stabilizing oxide possessing a thermal conductivity of about or less than about 100 BTU·in/ft$^2$·hr·° F. at room temperature (about or less than 14.4 W/m·° K at room temperature), each of the central housing, front side plate, and rear side plate being composed of the monolithic oxide stabilized zirconia, thereby each forming a monolithic zirconia ceramic part without the fluid cooling channels and when configured into the monolithic ceramic assembly, the monolithic ceramic assembly is sustainably operable at a temperature of about 900 degrees Celsius and greater when assembled without requiring a fluid cooling element or an external fluid cooling system, such that when configured into the monolithic ceramic assembly, the monolithic ceramic assembly does not have to supply power to cool the monolithic ceramic assembly, and does not have to pump water through an external water jacket.

2. The monolithic ceramic assembly of claim 1, wherein the ceramic material is a monolithic cerium oxide stabilized zirconia, and the stabilizing oxide is cerium oxide in an amount of about 13.5±0.5 wt. %.

3. The monolithic ceramic assembly of claim 1, wherein the ceramic material is a monolithic magnesium oxide stabilized zirconia, and the stabilizing oxide is magnesium oxide in an amount of about 3.175±0.175 wt. %.

4. The monolithic ceramic assembly of claim 1, wherein the monolithic oxide stabilized zirconia possesses a thermal conductivity of about 13.9 BTU·in/ft$^2$·hr·° F. at room temperature (about 2 W/m·° K at room temperature).

5. The monolithic ceramic assembly of claim 1, wherein the monolithic oxide stabilized zirconia possesses a thermal conductivity of less than or about 100 BTU·in/ft$^2$·hr·° F. at room temperature (less than or about 14.4 W/m·° K at room temperature).

6. The ceramic assembly of claim 1, wherein when the monolithic oxide stabilized zirconia is the cerium oxide stabilized zirconia the powder has a second median particle size distribution with 80% of particle size diameters in a range from about 0.80 to about 1.20 microns.

7. The ceramic assembly of claim 1, wherein when the monolithic oxide stabilized zirconia is the magnesium oxide stabilized zirconia the powder has a second median particle size distribution with 80% of particle size diameters in a range from about 1.77 to about 2.60 microns.

8. An internal combustion rotary engine comprising:
- a housing containing no fluid cooling channels, said housing having an epitrochoidally shaped inner surface, the housing further comprising:
  - a central element;
  - a front side plate; and
  - a rear side plate, wherein both the front and rear side plates contain no fluid cooling channels and the front side plate and rear side plate flank the central element;
- wherein, a trochoidally shaped rotor containing no fluid cooling channels comprises the central element and is configured to fit engagingly within said housing,
- wherein when formed as the internal combustion rotary engine, the internal combustion rotary engine includes at least one inner chamber,
- wherein each of the housing, central element, front side plate, and rear side plate are made from a monolithic zirconia ceramic material incorporating only one stabilizing oxide in a monoclinic crystalline lattice in solid solution,
- wherein the only one stabilizing oxide is selected from one of a cerium oxide in an amount greater than 12 wt. % and up to about 14 wt %, a cerium oxide in an amount at or about 13.5±0.5 wt. %, a magnesium oxide in an amount greater than about 2.5 wt. % and up to about 3.5 wt %, and a magnesium oxide in an amount at or about 3.175±0.175 wt. %,
- wherein the monolithic zirconia ceramic material when formed as any of the housing, central element, front side plate, and rear side plate possesses a thermal conductivity of less than or about 100 BTU·in/ft$^2$·hr·° F. at room temperature (less than or about 14.4 W/m·° K at room temperature),
- wherein said internal combustion rotary engine is sustainably operable at a temperature of about 900 degrees Celsius and greater when assembled without one or more of a substantial fluid cooling element and an external fluid cooling system,
- wherein said internal combustion rotary engine is sustainably operable, when assembled, without having a water cooling system,
- wherein said internal combustion rotary engine is sustainably operable, when assembled, without having to pump water through a water jacket, and
- wherein said internal combustion rotary engine when assembled is configured to operate with metal parts comprising a shaft, one or more bearings, one or more fasteners and one or more seals made possible by the thermal conductivity of the monolithic zirconia ceramic material, such that there is heat shielding of the metal parts.

9. The internal combustion rotary engine of claim 8, wherein under comparative conditions an exhaust gas temperature from the internal combustion rotary engine is at least 50% lower than exhaust gas temperature from a rotary engine having a same swept volume and made entirely of metal parts.

10. The internal combustion rotary engine of claim 8, wherein the monolithic zirconia ceramic material possesses a thermal conductivity of about 13.9 BTU·in/ft$^2$·hr·° F. at room temperature (about 2 W/m·° K at room temperature).

11. The internal combustion rotary engine of claim 8, wherein the internal combustion rotary engine when assembled achieves a lower rate of heat rejection as compared with an engine having a central element, front side plate, rear side plate and rotor made entirely of metal.

12. The internal combustion rotary engine of claim 8, wherein said internal combustion rotary engine operates at an elevated temperature, the elevated temperature being one that causes any one or more of localized melting, deformation, loss in strength, loss in mechanical integrity, and failure of metal in a comparative engine made of metal.

13. The internal combustion rotary engine of claim 8, wherein a powder from which the monolithic zirconia ceramic material was made has a surface area of about 7 $m^2g^{-1}$ and a first median particle size distribution with 50% of particle size diameters from about 0.60 to about 0.70 microns and a second median particle size distribution with 80% of particle size diameters from about 0.80 to about 1.20 microns.

14. The internal combustion rotary engine of claim 8, wherein a powder from which the monolithic zirconia ceramic material was made has a surface area of about 5 $m^2g^{-1}$ and a first median particle size distribution with 50% of particle size diameters from about 0.60 to about 1.38 microns and a second median particle size distribution with 80% of particle size diameters from about 1.77 to about 2.60 microns.

15. An internal combustion rotary engine comprising:
- one or more housings, each containing no fluid cooling channels, each housing having an epitrochoidally shaped inner surface and further comprising:
  - a central element;
  - a front side plate; and
  - a rear side plate, wherein both the front and rear side plates contain no fluid cooling channels, and the front side plate and rear side plate flank the central element;
- wherein a trochoidally shaped rotor containing no fluid cooling channels is configured as the central element to fit engagingly within each of the one or more housings,
- wherein when formed said internal combustion rotary engine includes more than one inner chamber,
- wherein for each housing, the housing, the central element, the front side plate and the rear side plate are each made of a ceramic material incorporating one stabilizing oxide in a monoclinic crystalline lattice in solid solution,
- wherein the one stabilizing oxide is selected from only one of a cerium oxide stabilized zirconia containing an amount greater than 12 wt % and up to about 14 wt % cerium oxide, a cerium oxide stabilized zirconia containing at or about 13.5±0.5 wt. % cerium oxide, a magnesium oxide stabilized zirconia containing an amount greater than about 2.5 wt % and up to about 3.5 wt % magnesium oxide, and a magnesium oxide stabilized zirconia containing at or about 3.175±0.175 wt. % magnesium oxide,
- wherein the ceramic material possesses a thermal conductivity of about or less than about 100 BTU·in/ft$^2$·hr·° F. at room temperature (about or less than about 14.4 W/m·° K at room temperature),
- wherein said internal combustion rotary engine is sustainably operable at a temperature of about 900 degrees Celsius and greater, when assembled, without a substantial fluid cooling element,
- wherein said internal combustion rotary engine is sustainably operable at a temperature of about 900 degrees Celsius and greater, when assembled, without an external water cooling system,
- wherein said internal combustion rotary, when assembled, is sustainably operable at a temperature of about 900 degrees Celsius and greater without a water cooling system, wherein said internal combustion rotary, when assembled, is sustainably operable at a temperature of about 900 degrees Celsius and greater without having to pump water through either of a water jacket and internal cooling channels, and wherein the internal combustion rotary engine is assembled with use of metal parts made possible by the thermal conductivity of the ceramic material, such that there is heat shielding of the metal parts.

16. The internal combustion rotary engine of claim 15, wherein the internal combustion rotary engine achieves a lower rate of heat rejection as compared with an engine having its central element, front side plate, rear side plate and rotor made entirely from metal.

17. The internal combustion rotary engine of claim 15, wherein said internal combustion rotary engine operates at an elevated temperature, the elevated temperature being one that causes any one or more of localized melting, deformation, loss in strength, loss in mechanical integrity, and failure of metal in a comparative engine made of metal.

18. The internal combustion rotary engine of claim 15, wherein the ceramic material is cerium oxide stabilized zirconia and is made from a powder having a surface area of about 7 $m^2g^{-1}$ and a first median particle size distribution with 50% of particle size diameters from about 0.60 to about 0.70 microns and a second median particle size distribution with 80% of particle size diameters from about 0.80 to about 1.20 microns.

19. The internal combustion rotary engine of claim 15, wherein the ceramic material is magnesium oxide stabilized zirconia and is made from a powder having a surface area of about 5 $m^2g^{-1}$ and a first median particle size distribution with 50% of particle size diameters from about 0.60 to about 1.38 microns and a second median particle size distribution with 80% of particle size diameters from about 1.77 to about 2.60 microns.

20. The internal combustion rotary engine of claim 15, wherein the one or more housings may share an adjacent side plate selected from the front side plate and the rear side plate.

* * * * *